United States Patent [19]

Beard et al.

[11] Patent Number: 4,516,307
[45] Date of Patent: May 14, 1985

[54] PIPE AND BAR STOCK TRANSFER AND MACHINING SYSTEM AND APPARATUS

[75] Inventors: Frederick H. Beard, Farmington Hills; Maynard M. Moyer, Rochester; Clarence Smith, Jr., Oak Park, all of Mich.

[73] Assignee: Snyder Corporation, Detroit, Mich.

[21] Appl. No.: 358,465

[22] Filed: Mar. 15, 1982

[51] Int. Cl.³ .................................................. B23B 41/00
[52] U.S. Cl. .................................... 29/564; 198/472; 198/775
[58] Field of Search ................. 29/564, 33 T; 408/44, 408/50, 70; 198/472, 747, 614, 472, 600, 775; 82/2.7, 2.5; 414/222, 745, 749, 750

[56] References Cited

U.S. PATENT DOCUMENTS

| | | | |
|---|---|---|---|
| 1,755,875 | 4/1930 | Holiday et al. | 198/774 |
| 1,834,728 | 12/1931 | Peterson | 198/614 |
| 2,902,139 | 9/1959 | Brenk et al. | 29/33 |
| 2,982,004 | 5/1961 | Cross | 29/33 |
| 2,983,498 | 5/1961 | MacGregor | 198/614 |
| 3,478,859 | 11/1969 | Krempel et al. | 198/472 |
| 4,397,174 | 8/1983 | Jungesjo | 198/774 |

Primary Examiner—William R. Briggs
Assistant Examiner—Thomas M. Kline
Attorney, Agent, or Firm—Barnes, Kisselle, Raisch, Choate, Whittemore & Hulbert

[57] ABSTRACT

An apparatus and method for machining and threading the end of pipe or bar stock which uses a pallet shuttle for clamping and locating the end of the stock to be machined and utilizes a lift-and-carry transfer bar system to move the work elements in a horizontal plane in synchronism with the shuttle motion of the pallets from one registry station to the next registry station. Separate idle supports are selectively raised and lowered in a timed relation to carry the work elements on the transfer bar. End location rollers are utilized to position the element axially and to unload the elements. A series of machining stations are positioned at the respective registries to machine first one end of the elements in a series of steps and then the other end of the elements in a series of steps.

11 Claims, 10 Drawing Figures

PIPE AND BAR STOCK TRANSFER AND MACHINING SYSTEM AND APPARATUS

BACKGROUND AND OBJECTS OF INVENTION

Long pipes used in well drilling utilize threaded ends, external or internal, for connection to other pipes or pipe couplings. The pipe lengths may vary. Since the pipes are fed into deep holes, sometimes hundreds of feet into the ground, it is important that the joints be reliably secure and as tight as possible. A defective joint may require the pulling of a long string of pipes which is expensive and time consumming. It will be understood that while the present invention is described in connection with long pipe lengths, it may be adapted to pipes, tubes, bar stock and other long work units.

With lower level production, the end threading of the work units can be accomplished reasonably well with a stationary threading means and some device for holding the work while being threaded. If the threading is accomplished by turning the work, this can create a problem since the long work elements are not always straight and the turning of the element will cause it to whip at the free end. The result can be an imperfectly threaded element.

With the increased demand and production of long length pipe resulting, to a degree, from increased oil well exploration and drilling, there has arisen a need for a means of threading pipe in larger quantities, and of improving the quality. The low lot threading equipment is not adequate to meet the demand.

Thus, it is an object of the present invention to provide a system and apparatus for machining and threading the ends of long work units in a production sequence which insures accuracy as well as being adapted to relatively large output. It is a further object to provide an apparatus which adapts to work units which are not absolutely straight throughout their lengths or which are not perfectly round at the end of be machined. It is another object to perform multiple machining and threading operations in sequence on elongate work units. The words "pipe", "work unit", "work element" or "stock" are applied to the particular workpiece being handled.

DESCRIPTION OF THE INVENTION

The invention comprises an apparatus which performs several functions in the machining of the work units. The work element is moved through the system in a direction laterally of the axis. A particular long length work unit or pipe, for example, is fed to a first station where it finds a plane of rest even though it may be curved along its axis or serpentine. The work element finds a horizontal plane of rest. A pallet of a continuous transfer system is then fed axially over one end of the work element and in a sense swallows that one end for a portion of its length. The element is then grasped adjacent its end with a first centralizing chuck and at a point spaced from the first chuck with a second centralizing chuck or an equalizing chuck which adapts to the position and shape of the element at that point.

Intermediate its ends, the stock is resting on flat supports which adjust readily to variations in the axial curvature of the pipe. The free end of the stock opposite the clamping pallet is then nested in a V-block to capture that end but the free end is not clamped.

With the stock thus supported, a machining operation can be performed on the end of the stock confined in the pallet. The various operations may consist of:

1. Outside diameter turning,
2. Rough contour outside diameter, end facing, and chamfer,
3. Finish contour machining and machining a groove or grooves,
4. Contour and cut an internal or external diameter thread concentric with a primary axis of the element.

In these various steps, the stock is transported or shuttled laterally to stations at which the holding pallet is located and clamped prior to the machining operation. The stock is transferred, not by a lift-and-carry mechanism, since the pallet is traveling in a single plane, but by a shuttle motion. In the transfer phase, the intermediate idle supports and the end supports, such as a V-block, are lowered, subsequent to the raising of a transfer bar to support the stock as it moves laterally; then the idle supports are raised to support the free end at the next station and the transfer bar lowered.

At the completion of the four steps outlined above, as an example, the pallet holding the machined end is axially withdrawn from that end, the opposite end of the stock is located axially, and a pallet series at the other end of the stock is initiated to clamp the unmachined end and perform the same steps as previously outlined. The threading can be achieved in single or multiple operations as desired.

Thus, when both ends of the element have been machined, the element is unclamped and discharged to a suitable receiving receptacle or area.

Other objects and features of the invention will be apparent in the following description and claims in which details of the apparatus required to perform the various steps in the system are set forth directed to persons skilled in the art of machining and transfer systems to enable the practice of the invention, all in connection with the best mode presently contemplated for the invention.

BRIEF DESCRIPTION OF THE DRAWINGS

Drawings accompany the disclosure and the various views thereof may be briefly described as.

DETAILED DESCRIPTION OF THE SYSTEM AND APPARATUS AND THE MANNER AND PROCESS OF USING IT

Figure 1A:
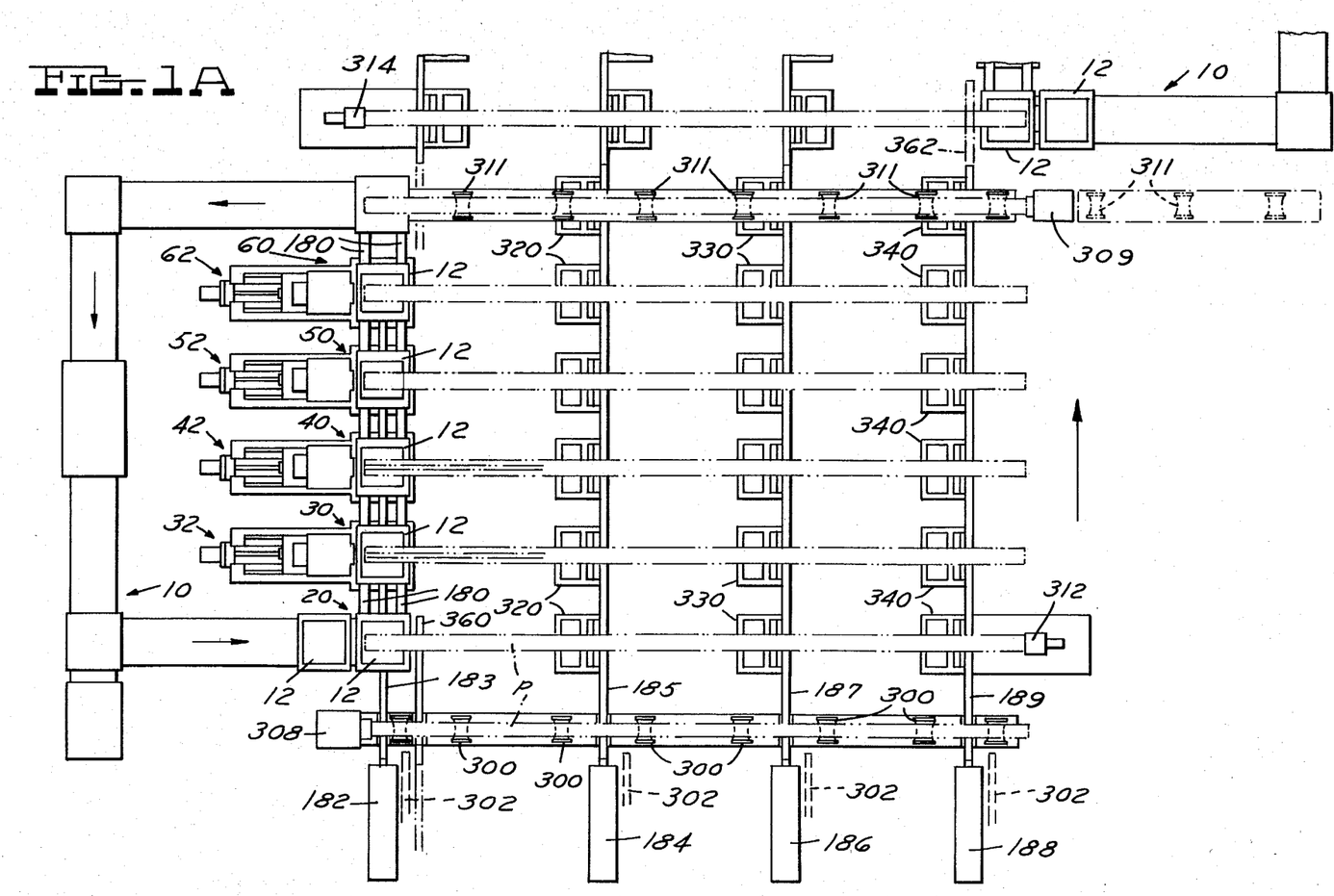
FIG. 1A, a plan view of the lateral feed apparatus and pallet system at the left-hand end of the work element.

With reference to FIG. 1A, at the left-hand side, is a rectangular pallet transfer system which carries pallets 12 in a continuous path. Conventional pallet moving mechanisms are utilized. A pallet loading registry station is shown at 20 and additional pallet registry stations are designated 30, 40, 50 and 60 along primary registry path. At each pallet registry station suitable and conventional locators, such as precision shot pins, and mechanical clamps will be provided to position the pallets for a particular machining operation. Machining consoles (illustrated by 32, 42, 52 and 62), are provided at the respective registry stations 30, 40, 50 and 60 to perform the desired machining operations on the work element ends. As previously indicated, these functions can include:

1. I.D. or O.D. turning,
2. Rough contouring, end facing and chamfering,
3. Finish contour and grooving, and
4. Threading.

Figure 1B:
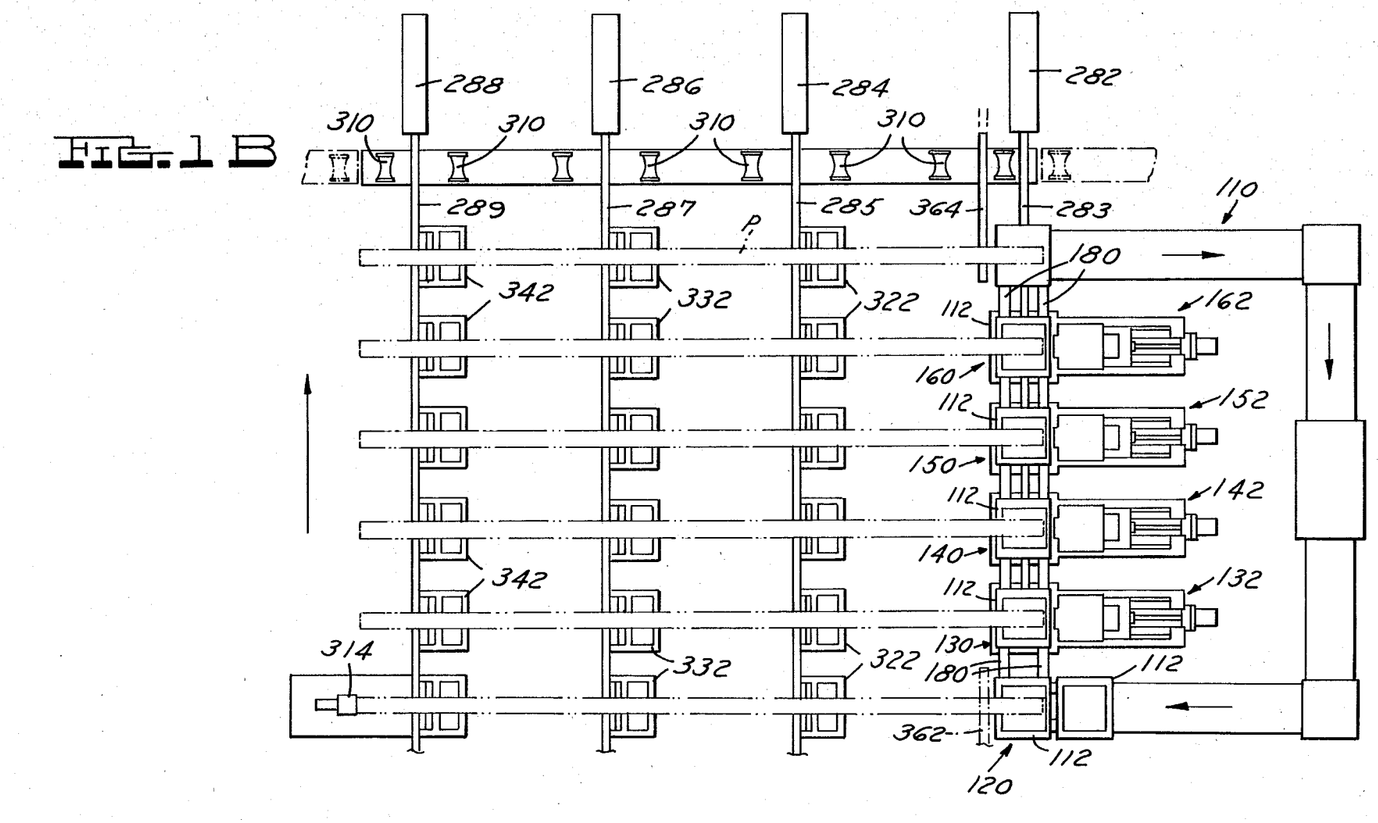
FIG. 1B, a continuation of FIG. 1A showing the pallet system at the right-hand end of the work elements.

In FIG. 1B at the right-hand side, a pallet transfer system is shown at 110 with pallet frames 112 and pallet stations 120, 130, 140, 150 and 160. Station 120 is a pallet entry station and typical machine consoles 132, 142, 152 and 162 are established at pallet locations 130, 140, 150 and 160.

The pallets slide on rails 180 and are moved by a suitable transfer shift mechanism to be described. A screw-type drive 182 which is synchronized with other similar drives 184, 186 and 188 is provided to actuate transfer bars 183, 185, 187 and 189 which extend in a direction parallel to the path of loaded pallets. In FIG. 1B, these elements are designated as 282, 284, 286 and 288 for the power drives, and the transfer bars are 283, 285, 287 and 289.

A loading assembly is illustrated at the bottom of FIG. 1A where spaced power rolls 300 receive a work element P from inclined feed bars 302 which may project through a horizontal opening 304 (FIG. 2A) in a wall 306 of a building structure. A standard escapement mechanism can release one pipe at a time to enter the opening 304 and drop into the power rolls. The power rolls 300 are rotated to move an entering work element endwise against a locating stop 308, shown in FIG. 1A, initially to position an element P longitudinally before moving it laterally into the first pallet position.

At the top of FIG. 1B is also an unloading assembly comprised of power rollers 310 which can be actuated to shift a completed work element to a delivery area or platform. Between the two systems illustrated in FIG. 1A is a roller assembly with rollers 311 to receive the work element after one end is machined. If desired, an element can be moved out of the system at this point if this is desirable for any reason such as defective construction. This set of rollers can also reposition the element axially for the next series of operations by moving it against a locating stop 309.

Also in FIGS. 1A and 1B are part positions 312 and 314, respectively, again provided to position a part endwise in a pallet during the initial clamping to be described.

As shown in FIGS. 1A and 1B, there are parallel ranks of rectangular frame members 320, 330 and 340 positioned in axial alignment with each pallet transfer station and beside transfer bars 185, 187 and 189, and frame members 322, 332 and 342 beside transfer bars 285, 287 and 289.

The frame members 320 and 330 in FIG. 1A and 322 and 332 in FIG. 1B serve to provide support and actuation for transfer bars and for the pipe idle supports when at rest. During the machining operation, the work elements may be supported in the area of frames 320 and 330 (1A) and 322 and 332 (1B) by intermediate flat supports. At the free ends of the work elements in the area of frames 340 and 342, the elements are supported in a V-notch of a V-block. For shorter work elements, the V-blocks could be located at frames 330 in FIG. 1A and 332 in FIG. 1B. The reason for the flat supports in the intermediate sections of the work element lies in the circumstance that an element which is not perfectly straight can find a horizontal rest position before it is clamped into a pallet. An example of a flat support is shown at 352 in FIG. 2B.

Figure 2A:
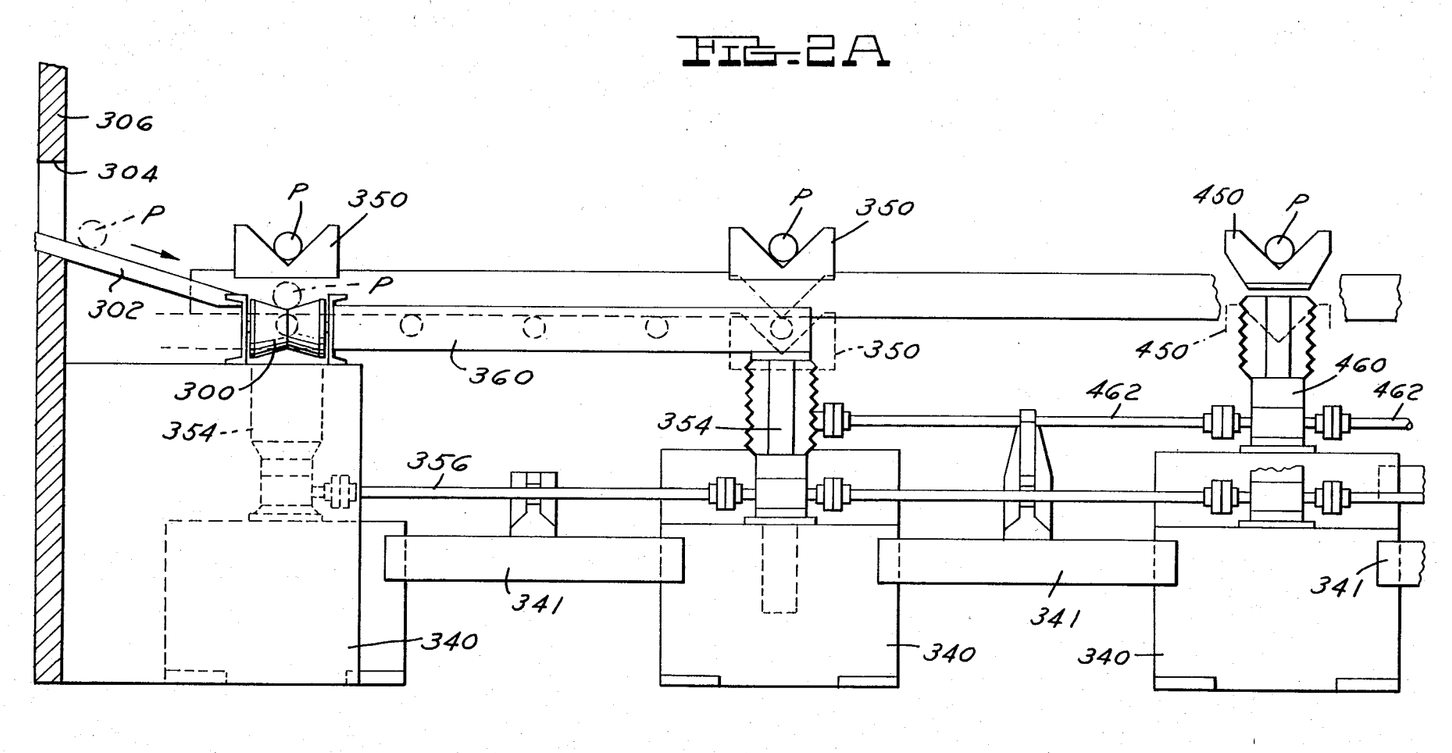
FIG. 2A, a vertical partial section showing the work element entrance end of the apparatus.
Figure 2B:
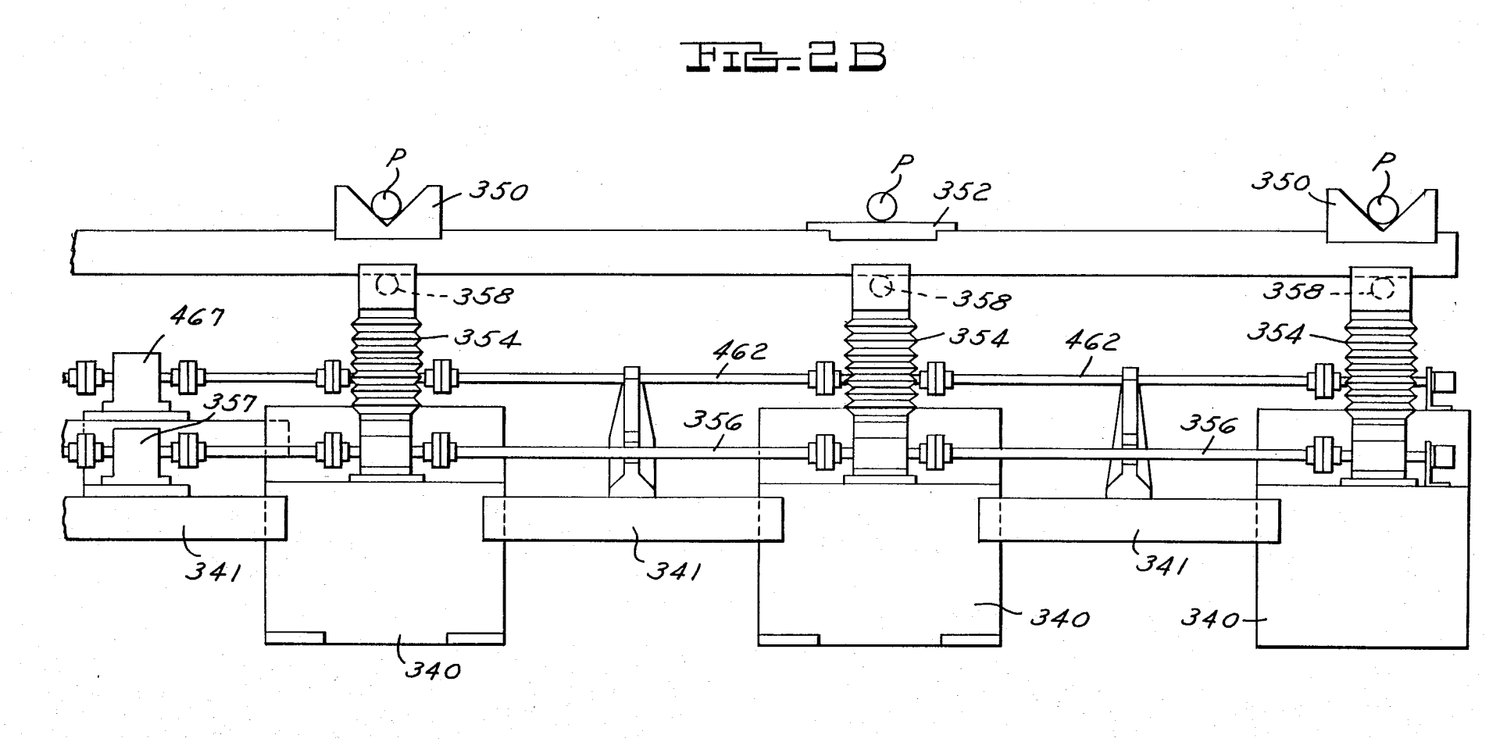
FIG. 2B, a continuation of the view of FIG. 2A.

In FIGS. 2A and 2B, a transfer bar mechanism is illustrated. The bar has V-blocks 350 spaced along its length or may have flat supports 352. The bar is supported along its length by ball screw assemblies 354 driven by a rotating shaft 356. Synchronized hydraulic motors 357 (at the left of FIG. 2B) are utilized to drive the lift shafts 356. These drives are suitably synchronized. Each support 354 has a transfer bar support roller 358 to facilitate the lineal movement of the bars. A short supplemental support bar 360 is provided to support and lift the work element end at the entrance area before it is secured in a pallet. In FIG. 1B, this is shown at 360. At the discharge areas, a similar bar 364 functions after pallet release.

In FIGS. 2A and 2B, the transfer bar is in the up position. The dotted V-block 350D in the middle of FIG. 2A shows a transfer bar V-block in a down position.

Figure 3:
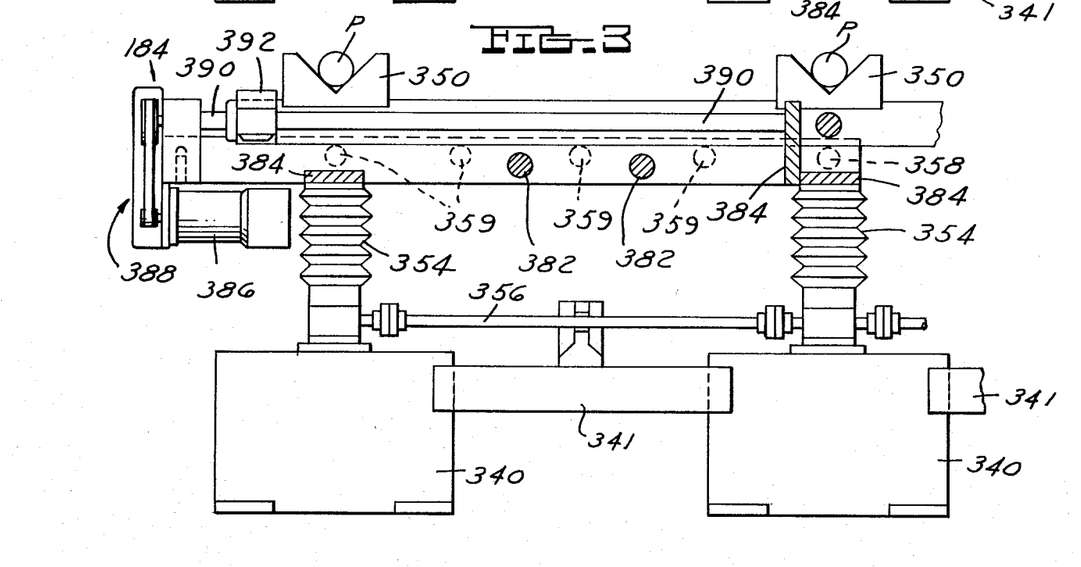
FIG. 3, a vertical section of the transfer bar lineal drive and supports for one end of the work element.
Figure 4:
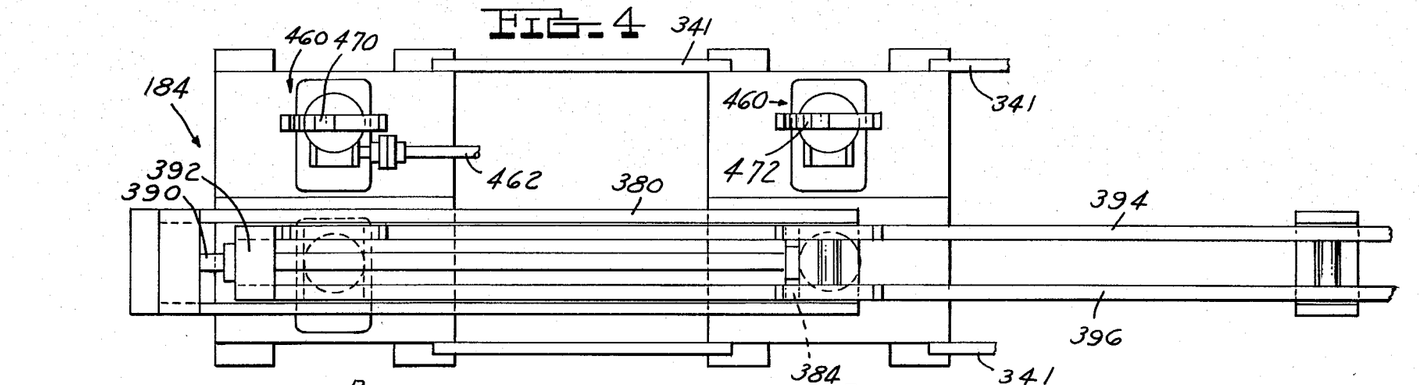
FIG. 4, a plan view of the drive and supports shown in FIG. 3.

In FIGS. 3 and 4, the lineal transfer mechanism for the transfer bar is illustrated. The end of the transfer bar is supported on rollers 359 in an open-topped channel box having sides 380 connected by rods 382 and plates 384. A motor 386 moves a drive train 388 which rotates a screw 390 passing through a nut 392 mounted on the channel box and connected to the ends of the transfer bar. Rotation of the screw 390 causes the nut 392 to travel in the channel box and drives the transfer bar composed of spaced lengths 394, 396 linearly for a predetermined stroke and return. The support box must also rise and fall with the transfer bar. This is accomplished by the lift screw assemblies 354. The linear drive system thus moves up and down with the transfer bars.

The mechanism illustrated and described in FIGS. 3 and 4 is shown diagrammatically at 184, 186 and 188 in FIG. 1A and at 284, 286 and 288 in FIG. 1B.

Referring to FIGS. 2A and 2B, it will be seen that the row of frame support elements 340, as an example, are connected by tie bars 341. As previously suggested, each frame member mounts the tie bars through ball screw assemblies 354. However, behind each of these ball screw assemblies and mounted in frames 340 are element supports referred to as idle supports. These idle supports carry the work element at each station when the element end, secured in a located and clamped pallet, is being machined.

In FIG. 2A, one of these idle supports, as a V-block, is shown at the right at 450. In the full line position, the support is in the "up" idle position. In the dotted line position, the support is in a "down" position. These supports 450 at each frame member are likewise mounted on a ball screw assembly 460 driven by a rotating rod 462 and a hydraulic motor 467 (FIG. 2B) synchronized in operation with motor 356. As previously indicated, the idle supports in frames 320 and 330 and 322 and 332 can be flat as shown at 352 in FIG. 2B. In FIG. 4, the plan view shows the manner in which the idle supports are mounted behind the transfer bar supports. Idle nests 470 and 472 are illustrated here mounted on the ball screw assemblies 460.

Thus, at each support frame a work element section will be supported either by the idle nests (flat or V-shaped) or, alternatively, during a transfer phase, by the transfer block supports. The action of hydraulic motors 357 and 467 are such that the idle nests come up to support the work element at the completion of the transfer phase, after which the transfer bar lowers. At the beginning of a transfer phase, the transfer bar supports will come up to meet the work element after which the idle nests are lowered to clear the element movement as the linear motion of the transfer bars progresses. Thus, while the transfer bar has a lift-and-carry motion, the work element itself is not lifted but is simply shuttled in a horizontal plane from one station to the next.

Figures 5, 6:
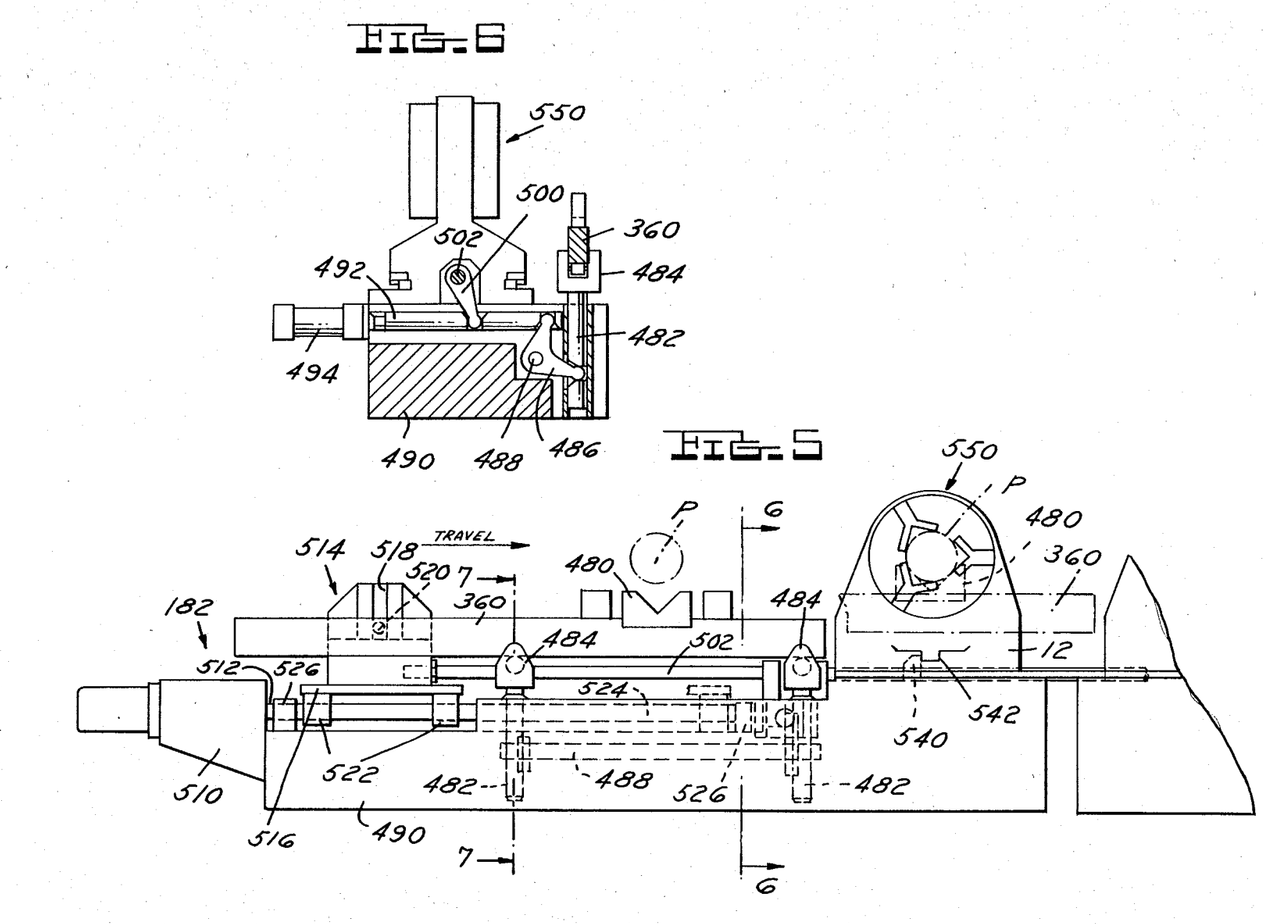
FIG. 5, a side view of a pallet fixture and an entrance transfer bar and drive.
FIG. 6, a sectional view on line 6—6 of FIGS. 5 and 8.
Figures 7, 8:
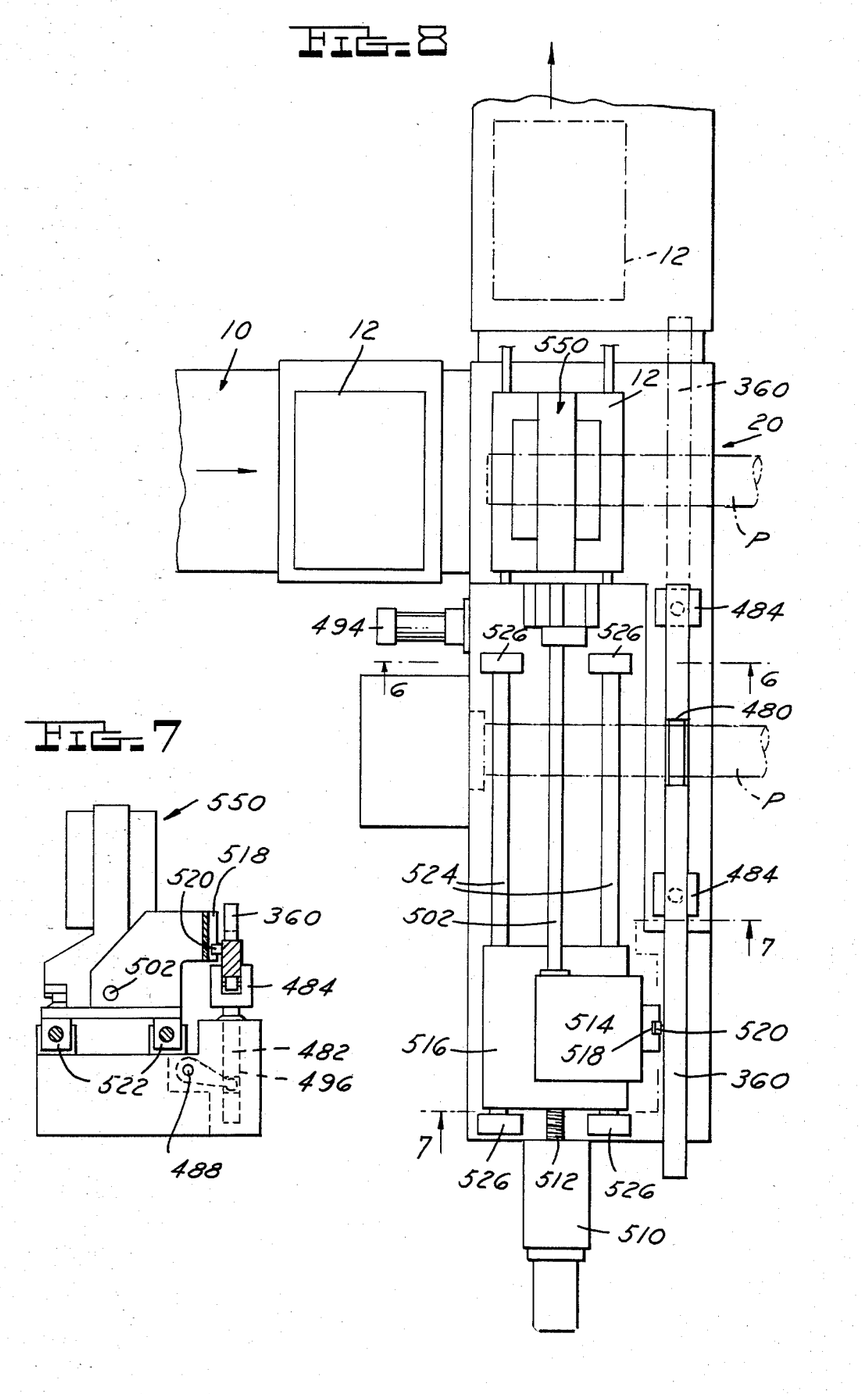
FIG. 7, a view of one of the entrance transfer bar lifts on line 7—7 of FIG. 5.
FIG. 8, a top view of a pallet transfer corner and drive as shown in FIG. 5.

In FIGS. 5 and 8, are, respectively, side and plan views of the entrance corner of the overall assembly shown diagrammatically in FIG. 1A at 182. This is the corner at which the pallet will engage the work element prior to the initiation of the machining operations. It will be appreciated that in order for the pallet to receive the element end, the element end must be freely extending. However, it is also important that the free end of the work element be supported so it will not sag before receiving support from the pallet. The previously referenced short bars 360, 362 and 364 can provide this support. In FIG. 5, the bar 360 carries V-block 480 which will engage the work element P when lifted. In the sectional view of FIG. 6, taken on line 6—6 of FIGS. 5 and 8, a lift mechanism for bar 360 is shown. Lift rods 482 are supported by two clevis members 484 carrying rollers to support the bar 360. A bellcrank 486 pivoted on a shaft 488 in a base 490 engages an opening in rod 482 at one end. The other end of the bellcrank is engaged with an actuator rod 492 connected to a piston rod of cylinder 494. Thus, actuation of the piston in cylinder 494 will rotate the bellcrank 486 in a counter-clockwise direction to cause rod 482 and bar 360 to lift. Shaft 488 extends to a second lift rod 482 shown in FIG. 7 where a lever 496 splined to shaft 488 will effect simultaneous actuation of the rods 482.

In FIG. 6, a link 500 is also engaged on one end with actuator rod 492. This link is splined to a shaft 502 to actuate a pallet pusher 540 referenced later.

At the left-hand end of FIGS. 5 and 8 is a D.C. motor 510 which drives a screw shaft 512. A shuttle 514 on platform 516 connects to one end of a bar 360 in a vertical slot 518 through a pin 520. Platform 516 is mounted over screw 512 by traveling nuts 522. Guide bars 524 are provided for platform 516, the ends being mounted in blocks 526. Thus, movement of shuttle 514 carries bar 360 forward on the clevis supports 484. Slot 518 accommodates the vertical motion of the bar.

A dog 540 (right-hand end of FIG. 5) is mounted on the pallet push rod 502 and when rotated by the rod it will engage a lug 542 on a pallet. The pallets 12 are shown in FIG. 8 coming empty along the path 10. Each pallet has mounted thereon locating chucks to receive and secure an element end. Each pallet has preferably two chucks which can be actuated seriatim, that is, the chuck nearest the end closes first. In FIG. 5, a chuck 550 is shown diagrammatically in a housing which can mount two chucks as desired.

In the loading, a work element P is released and rolled into the assembly of rollers 300 (FIG. 2A) and then lifted by the transfer bars to a position shown by the dotted lines for bar 360 in FIG. 5. At this stage, there is no pallet in the corner spot. A pallet 12 is then brought forward along a secondary path in a conventional machine to swallow the supported end of a work element P and the chucks 550 are engaged against the element. The lifting and shifting of the bar 360 by the rods 482 and the shuttle 514 also causes turning of the pallet mover shaft 502 to move a pallet pusher dog 542 to a pallet engaging position. Advancing the carry bar 360 moves a pallet out of the corner to make room for the advance of another pallet. Once the work element is secured in the pallet, the remainder of the transfer bars are moved to advance the secured element with the pallet to a first machining station as at 32 in FIG. 1A. The transfer bars may also be utilized to shift the pallets along the progressive machining path from station to station in a synchronized motion so that the entire work element moves laterally from station to station. The element P is in turn moved laterally to each of the subsequent stations until the machining at one end is completed. Then the work is moved on to the power rollers 311, positioned endwise at stop 309, and moved into the first pallet position on the right-hand end where machining of that end will progress until final discharge of the work element to rollers 310.

What is claimed is:

1. A machining and handling apparatus for the finishing of work elements in the form of long cylindrical or rectangular bars or tubes which comprises:
    (a) a plurality of pallet registry stations positioned along a primary lineal path adjacent a plurality of machining consoles,
    (b) pallet means movable along said path in step-by-step progression to said registry stations,
    (c) means on each said pallets to locate and clamp the one end of a work element disposed normal to said path,
    (d) a plurality of parallel transfer bars spaced laterally from said path,
    (e) retractable first means adjacent said bars in substantial alignment with said registry stations in a direction normal to said path selectively operable to support the remaining portion of said work element in an idle position in a predetermined plane for a machining operation, and
    (f) second means in a transfer position to support said work element in said plane independent of said first means for transfer movement in the direction of said path from one station to another in said predetermined plane.

2. A machining and handling apparatus for the finishing long cylindrical or rectangular work elements which comprises:
    (a) a plurality of pallet registry stations positioned along a primary lineal path adjacent machining consoles,
    (b) pallet means movable along said path in step-by-step progression to said registry stations, (c) means on each said pallets to locate and clamp the end of a work element disposed normal to said path, (d) a plurality of parallel transfer bars spaced laterally from said path, and (e) means on and adjacent said bars in substantial alignment with said registry stations in a direction normal to said path selectively operable to support the remaining portion of said work element in an idle at rest position in a predetermined plane for a machining operation and in a transfer position for movement in the direction of said path in said predetermined plane, said means on and adjacent said bars comprising a lineal rank of idle supports vertically movable to a support position adjacent said predetermined plane and to a vertically displaced clearance position away from said plane, and means on said bars movable vertically from a clearance position away from said plane to a work element support position adjacent said plane and the latter means being displaceable with said bars in the direction of said path to move the remaining portion of said work element from one pallet registry position to a subsequent registry position.

3. A machining and handling apparatus as defined in claim 2 in which said lineal rank of idle supports comprise a plurality of aligned vertical ball screw first assemblies having a work element support at the upper end, a first horizontal rotary screw shaft operably connecting said assemblies for simultaneous operation of said assemblies, and a power drive member for actuating said first screw shaft.

4. A machining and handling apparatus as defined in claim 2 in which said bars are moved vertically to and away from the recited positions by a plurality of ball screw second assemblies, second rotating screw shaft means operably connecting said assemblies for simultaneous operation, and power drive means for actuating said second screw shaft.

5. A machining and handling apparatus as defined in claim 4 in which said transfer bars are located for lineal motion on said second ball screw assemblies, and means movable vertically and lineally with said transfer bars to shift said bars linearly on said second ball screw assemblies.

6. A machining and handling apparatus for the finishing long cylindrical or rectangular work elements which comprises:

(a) a plurality of pallet registry stations positioned along a primary lineal path adjacent machining consoles, (b) pallet means movable along said path in step-by-step progression to said registry stations, (c) means on each said pallets to locate and clamp the end of a work element disposed normal to said path, (d) a plurality of parallel transfer bars spaced laterally from said path, (e) means on and adjacent said bars in substantial alignment with said registry stations in a direction normal to said path selectively operable to support the remaining portion of said work element in an idle at rest position in a predetermined plane for a machining operation and in a transfer position for movement in the direction of said path in said predetermined plane, (f) said pallet system associated with said pallet registry stations having a second path at right angles to said primary path to feed empty pallets to a first registry station at one end of said primary path at a corner between said primary and second paths, and (g) a supplemental support bar positioned parallel to and adjacent said primary path at said corner to lift and support the end of a work element as an empty pallet moves into a supporting position around said end.

7. A machining and handling apparatus as defined in claim 6 in which means is provided for lifting said supplemental support bar comprising a plurality of vertical rods secured below and supporting said bar, a bellcrank and shaft operably connected to said rods, and means for actuating said bellcrank and shaft comprising a piston-cylinder combination.

8. A machining and handling apparatus as defined in claim 7 in which an actuator rod is interposed between said bellcrank and said piston-cylinder combination, and a second shaft rotatable by said actuator rod operably associated with a pallet pusher dog to engage a pallet when said bar is lifted and shifted.

9. A machining and handling apparatus as defined in claim 6 in which means is provided for linearly shifting said supplemental bar comprising a bar support in which said bar is movable, shuttle means is connected to said bar, and means to actuate said shuttle means to shift said supplemental bar linearly.

10. A machining and handling apparatus as defined in claim 6 in which said supplemental bar is supported for lineal movement in a plurality of vertical rods, a means for lifting said rods comprises a bellcrank, lever and shaft, one end of said bellcrank being mechanically associated with one of said rods and the other end of said bellcrank being connected to an actuating rod, said shaft being connected to said bellcrank and said lever connected to a second vertical rod, and power means for acutating said actuator rod to shift said bellcrank, shaft and lever to lift said vertical rods.

11. A method of machining and threading the ends of long work elements in a machine which has support pallets movable to respective registry stations and in which spaced idle rest devices are provided to support the work elements in a machining position and in which transfer bar supports are provided to move said work elements to respective stations which comprises:

(a) supporting said work element horizontally at spaced points along its length, (b) moving said element in a horizontal plane to a pallet loading position, (c) moving a support pallet in an axial direction to embrace and engage one end of said element, (d) simultaneously moving said pallet and said element in a horizontal plane along a primary pallet path in a direction transverse to the axis of said work element in a step-by-step movement to sequential pallet registry stations, (e) machining said one end of said element at each station, (f) discharging a machined work element to a horizontal support, (g) supporting the remaining portion of said work element on a series of spaced idle rest devices during a machining operation, (h) raising transfer bar supports to hold said remaining portion of the element and lowering the idle rest devices, (i) moving said element laterally to an adjacent subsequent registry station with said transfer bar supports, (j) raising idle rest devices at said subsequent station, and (k) lowering said transfer bar supports during a subsequent machining operation.

* * * * *

UNITED STATES PATENT AND TRADEMARK OFFICE
CERTIFICATE OF CORRECTION

PATENT NO. : 4,516,307

DATED : May 14, 1985

INVENTOR(S) : Frederick H. Beard, Maynard M. Moyer, and Clarence Smith, Jr.

It is certified that error appears in the above-identified patent and that said Letters Patent are hereby corrected as shown below:

Column 6, Line 52, after "idle" insert -- at rest --.

Signed and Sealed this

Eighth Day of October 1985

[SEAL]

Attest:

Attesting Officer

DONALD J. QUIGG

Commissioner of Patents and Trademarks—Designate